United States Patent [19]
Barnes et al.

[11] Patent Number: 5,755,460
[45] Date of Patent: May 26, 1998

[54] INSTRUMENT PANEL SEAMLESS AIR BAG COVER

[75] Inventors: William Joseph Barnes, Waterford; Sharon Lynn Hill, Clio, both of Mich.

[73] Assignee: General Motors Corporation, Detroit, Mich.

[21] Appl. No.: 734,813

[22] Filed: Oct. 22, 1996

[51] Int. Cl.$^6$ ............................. B06R 21/20; B06R 21/22
[52] U.S. Cl. ...................... 280/728.3; 280/732; 180/90
[58] Field of Search ................. 280/728.3, 732, 280/730.1, 728.2, 752; 180/90; 296/70

[56] References Cited

U.S. PATENT DOCUMENTS

| | | | |
|---|---|---|---|
| 3,794,349 | 2/1974 | Fuller | 280/732 |
| 3,817,552 | 6/1974 | Knight, IV et al. | 280/732 |
| 5,333,901 | 8/1994 | Barnes | 280/732 |
| 5,603,524 | 2/1997 | Barnes et al. | 280/728.3 |

*Primary Examiner*—Peter C. English
*Attorney, Agent, or Firm*—Charles E. Leahy

[57] ABSTRACT

An air bag module is mounted on the instrument panel structure forwardly of the passenger seating position and has an air bag normally stored and folded therein and inflatable to project into the occupant compartment to restrain the passenger. An instrument panel cover is mounted atop the instrument panel structure to conceal the air bag from view and extends transversely across the instrument panel structure forwardly of both the driver and passenger sides of the occupant compartment. The instrument panel cover has a weakened tear seam which originates at the rearward most edge of the cover, at a point between the driver and the passenger and proceeds from the rearward edge in a generally forward direction. The driver side portion of the instrument panel cover is fixedly fastened to the instrument panel structure. The passenger side portion of the instrument panel cover is detachably fastened to the instrument panel cover. Upon inflation of the air bag, the passenger side of the instrument panel cover is forcibly lifted and pivoted upwardly as permitted by detachment of detachable fasteners and the tearing of the instrument panel cover along the weakened tear seam. The instrument panel cover is preferably of the type including a raised hood portion which wraps around the instrument display cluster and the weakened tear seam extends in a curving path around the margin of the raised hood portion and is hidden thereby.

4 Claims, 7 Drawing Sheets

INSTRUMENT PANEL SEAMLESS AIR BAG COVER

The invention relates to an instrument panel cover concealing a passenger side air bag and having a hidden tear seam extending forwardly from the rearward most edge of the instrument panel cover between the driver and passengers so that the portion forwardly of the passenger can lift up during air bag deployment.

BACKGROUND OF THE INVENTION

It is well known in motor vehicles to provide an inflatable air bag which deploys into the occupant compartment to cushion the occupant. Such air bag systems typically include a driver air bag mounted on the steering wheel and a passenger air bag mounted on the instrument panel forwardly of the passenger seating position.

It is well known to mount the passenger air bag module beneath the top surface of the instrument panel and to provide an air bag deployment opening in the padded instrument panel cover. The deployment opening in the instrument panel cover is closed by an air bag door which opens in response to the air bag deployment to permit the air bag to deploy into the occupant compartment. The juncture between the cover and the door defines a visible seam.

U.S. Pat. No. 5,333,901, by William J. Barnes of General Motors Corporation, provided an instrument panel cover in which the rearward most portion thereof was detachably connected to the instrument panel structure so that deployment of the air bag would detach the rearward part of the cover and pivot the instrument panel cover upwardly to permit the air bag to deploy without necessity for an opening and a door in the instrument panel cover, and thereby avoiding the presence of a visible seam.

The present invention provides an improvement in the detachable instrument panel cover.

SUMMARY OF THE INVENTION

According to the invention, an air bag module is mounted on the instrument panel structure forwardly of the passenger seating position and has an air bag normally stored and folded therein and inflatable to project into the occupant compartment to restrain the passenger. An instrument panel cover is mounted atop the instrument panel structure to conceal the air bag from view and extends transversely across the instrument panel structure forwardly of both the driver and passenger sides of the occupant compartment. The instrument panel cover has a hidden weakened tear seam which originates at the rearward most edge of the cover, at a point between the driver and the passenger and proceeds from the rearward edge in a generally forward direction. The driver side portion of the instrument panel cover is fixedly fastened to the instrument panel structure. The passenger side portion of the instrument panel cover is detachably fastened to the instrument panel cover. Upon inflation of the air bag, the passenger side of the instrument panel cover is forcibly lifted and pivoted upwardly as permitted by detachment of detachable fasteners and the tearing of the instrument panel cover along the weakened tear seam. The instrument panel cover is preferably of the type including a raised hood portion which wraps around the instrument display cluster and the weakened tear seam extends and is hidden in a curving path around the margin of the raised hood portion. A reinforcing bracket is preferably attached to the instrument panel cover and extends alongside the weakened tear seam to assist in fixedly fastening the driver side portion to the instrument panel structure to effectively hold down the instrument panel cover and thereby facilitate the tearing of the instrument panel cover along the weakened tear seam.

BRIEF DESCRIPTION OF THE DRAWINGS

These and other objects, features and advantages of the invention will become apparent upon consideration of the description of the preferred embodiment and the appended drawings in which.

DESCRIPTION OF THE PREFERRED EMBODIMENT

Figure 1:
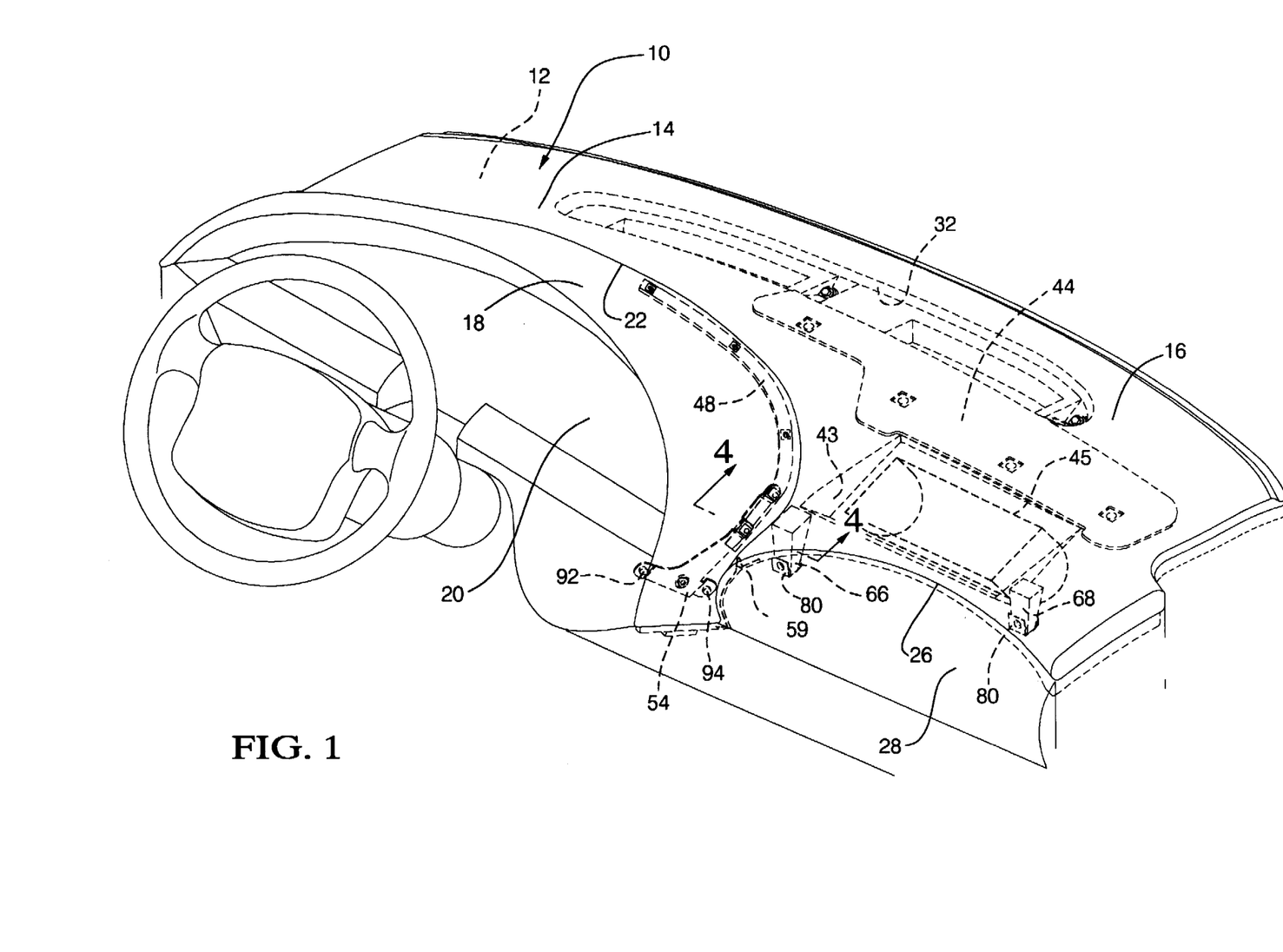
FIG. 1 is a perspective view of a motor vehicle instrument panel showing the instrument panel cover in its normal position and having parts broken away and in section.

Referring to FIG. 1, the motor vehicle body has an instrument panel cover assembly 10 which lies atop and conceals an instrument panel structure 12 of the vehicle body. As seen in FIG. 1, the instrument panel cover assembly 10 is a generally planar panel which includes a driver side portion 14 situated forwardly of the vehicle driver and a passenger side portion 16 situated forwardly of the vehicle passenger. The driver side portion 14 of the instrument panel cover assembly includes a raised hood portion 18 which wraps around an instrument display cluster 20 and is visibly separated from the more planar portion of the instrument panel cover assembly by a styling line 22. The passenger side portion 16 of the instrument panel cover assembly 10 has a rearward edge 26, which is disposed above a glove box door 28 or other generally vertically arranged decorative panel. The instrument panel cover assembly 10 also includes a defroster outlet opening 32, which normally receives a defroster outlet grille, not shown.

Figure 3:
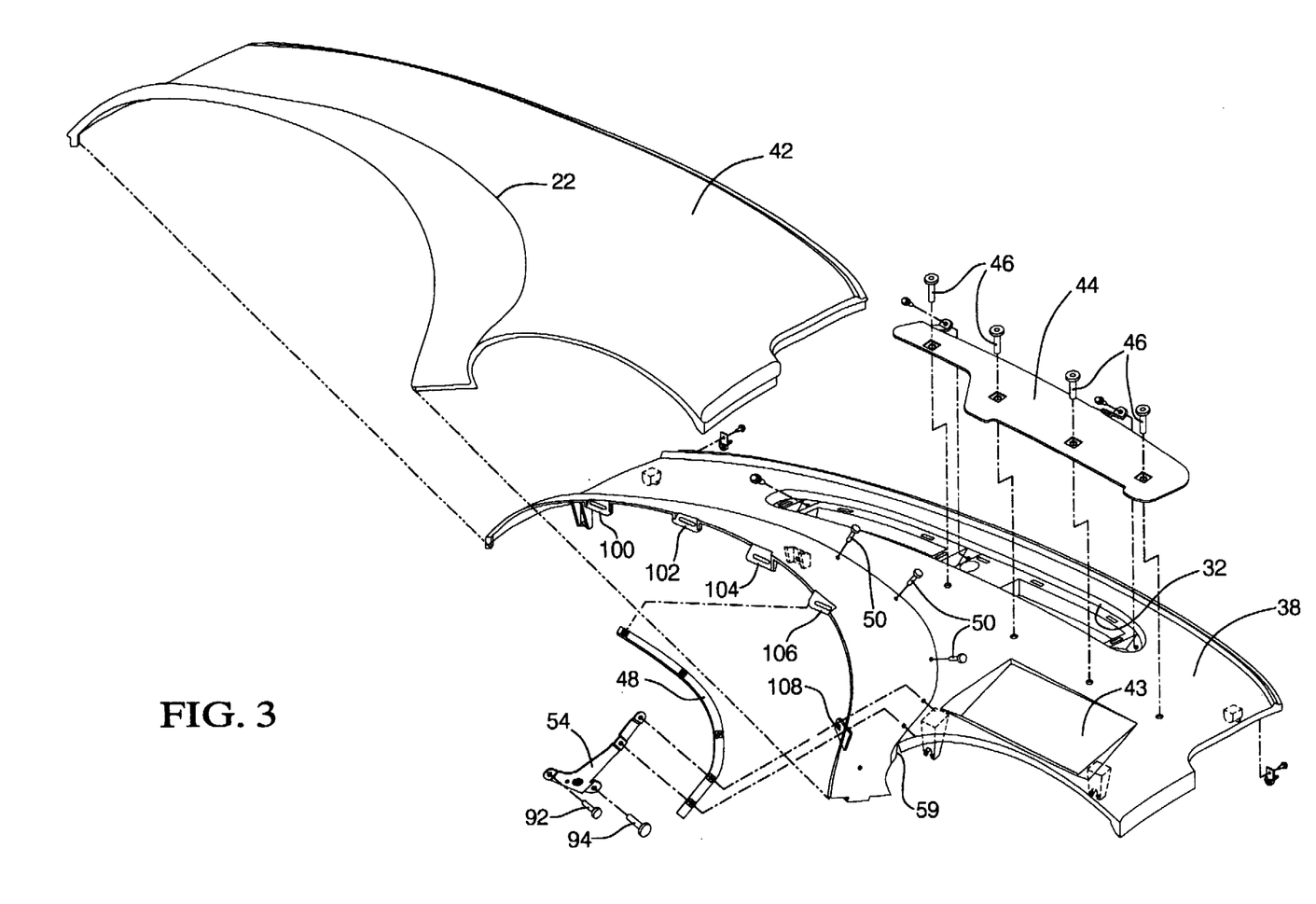
FIG. 3 is an exploded perspective view of the instrument panel cover assembly of FIG. 2.
Figure 4:
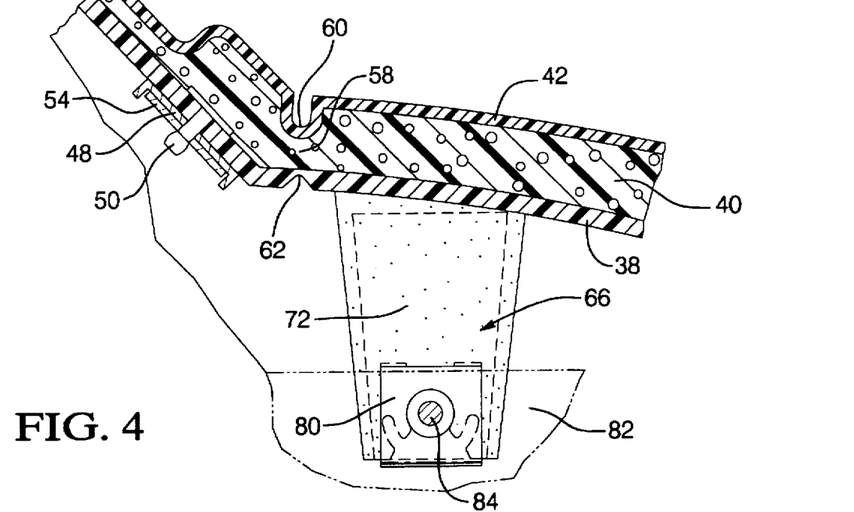
FIG. 4 is a section view taken in the direction of arrows 4—4 of FIG. 1.

Referring to FIGS. 3 and 4, it is seen that the instrument panel cover assembly 10 is comprised of a retainer panel 38 of a rigid plastic material such as polycarbonate, a layer of foam padding 40 and a vinyl sheet cover 42. The retainer panel 38 includes a recessed wall 43 which closely overlies an air bag module 45, as seen in FIG. 1.

Figure 2:
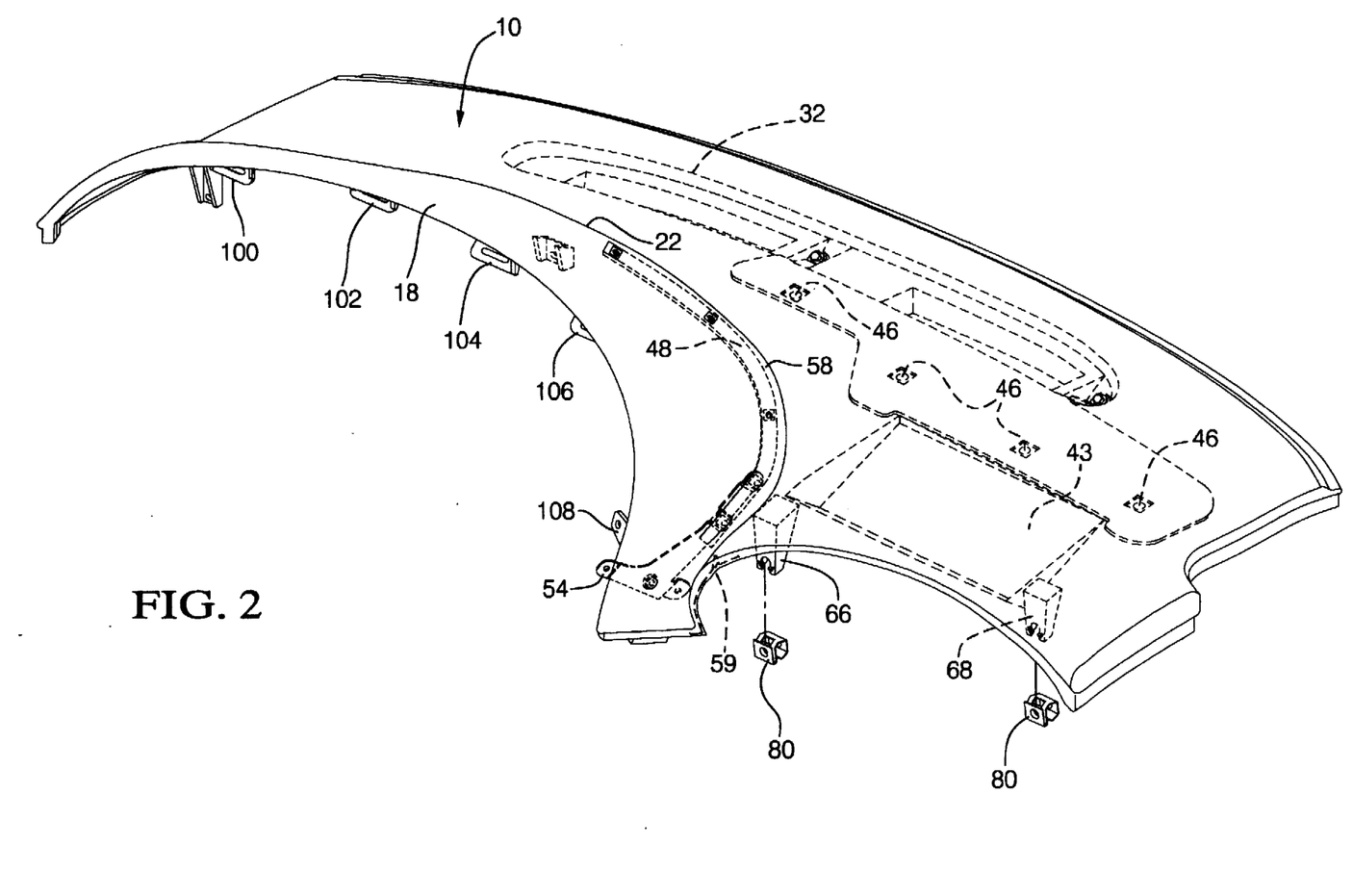
FIG. 2 is a view similar to FIG. 1 but showing only the instrument panel cover assembly.

As best seen in FIG. 3, a stamped metal reinforcing hinge bracket 44 is attached to the retainer panel 38 by rivets 46. In addition, a reinforcing bracket 48 is attached to the retainer by rivets 50 as seen in FIG. 2. An anchor bracket 54 is attached to the reinforcing bracket 48 and is attached to the vehicle instrument panel structure 12 as will be discussed hereinafter.

As seen in FIG. 4, a weakened tear seam 58 is provided in the instrument panel cover assembly 10 and, more particularly, is provided by an undercut recess 62 molded integrally in the retainer panel 38, and a recess 60 which is provided in the vinyl cover 42. It will be appreciated that the recess 60 of the vinyl cover 42 defines the styling line 22 which visually separates the instrument panel hood portion of the instrument panel cover assembly from the more planar horizontal portion of the instrument panel cover assembly. As best seen in FIGS. 1, 2 and 3, the weakened tear seam 58 begins at tear initiator notch 59 located at the rearward edge 26 of the instrument panel cover and reaches forward a predetermined distance. It will be appreciated that the alignment of the recess 62 of the retainer panel 38 with the recess 60 of the vinyl cover, together with the thinning of the molded foam 40 therebetween, cooperate to make the weakened tear seam 58 susceptible to tearing under application of a specified force thereto, while at the same time hiding the tear seam to provide a seamless appearance.

As best seen in FIGS. 2 and 4, the passenger side portion 16 of the instrument panel cover assembly is detachably retained to the instrument panel structure 12 of the vehicle body by detachable fastener assemblies, generally indicated at 66 and 68.

Figure 6:
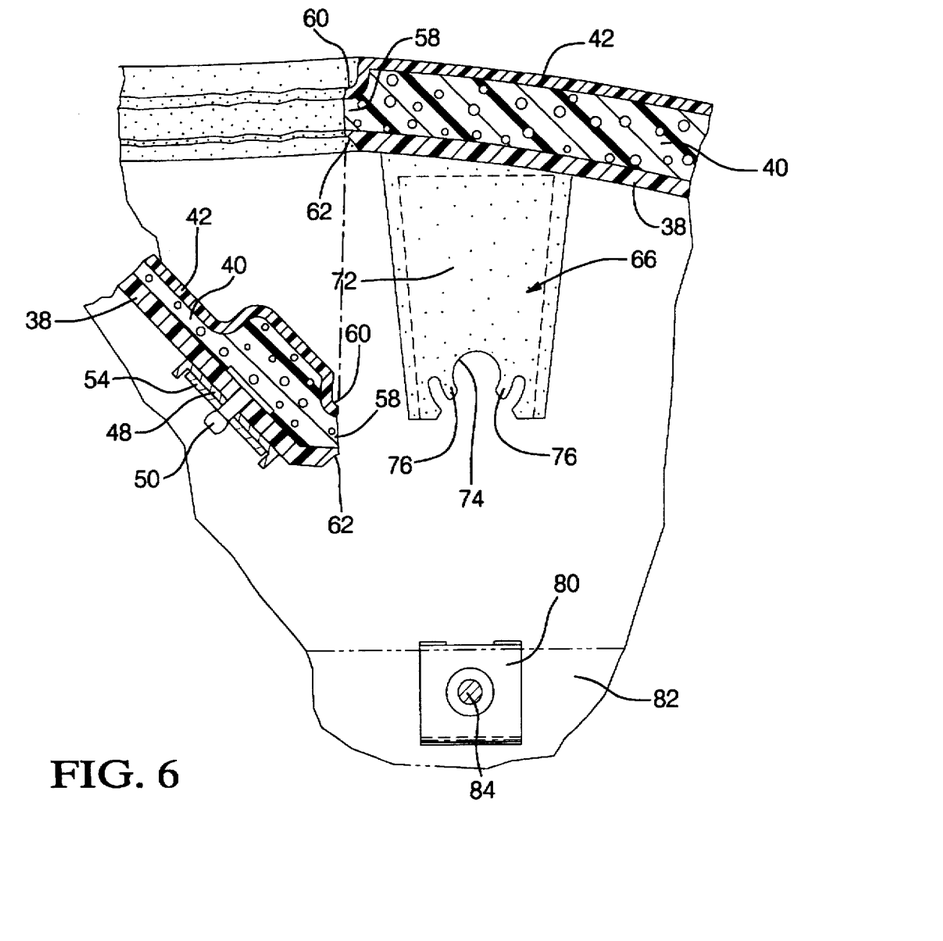
FIG. 6 is a sectional view taken in the direction of arrows 6—6 of FIG. 5.

As best seen in FIGS. 2, 4 and 6, the detachable fastener assembly 66 includes a leg 72 which is integral with and depends downwardly from the molded retainer 38 and has a semicircular opening 74 and flexible fingers 76 for gripping a stamped metal fastener 80 which is attached to a panel 82 of the vehicle body's instrument panel structure 12 by a screw 84. FIG. 4 shows the leg 72 gripped by the fastener 80 and screw 84 to attach the rearward edge 26 of the passenger side portion 16 of the instrument panel cover assembly to the instrument panel structure 12. Further description of the detachable fastener assembly 66 and its details of operation can be had by reference to U.S. Pat. No. 5,603,524 issued Feb. 18, 1997.

Referring again to FIGS. 1 and 2, it is seen that the driver side portion 14 of the instrument panel cover assembly 10 is fixedly fastened to the vehicle instrument panel structure 12 by screws 92 and 94 which attach the anchor bracket 54 to the vehicle body structure. In addition, a plurality of screws are installed through attaching legs 100, 102, 104, 106 and 108 to fixedly attach the hood portion 18 of the instrument panel cover assembly 10 to the instrument panel structure 12 of the vehicle body.

Figure 5:
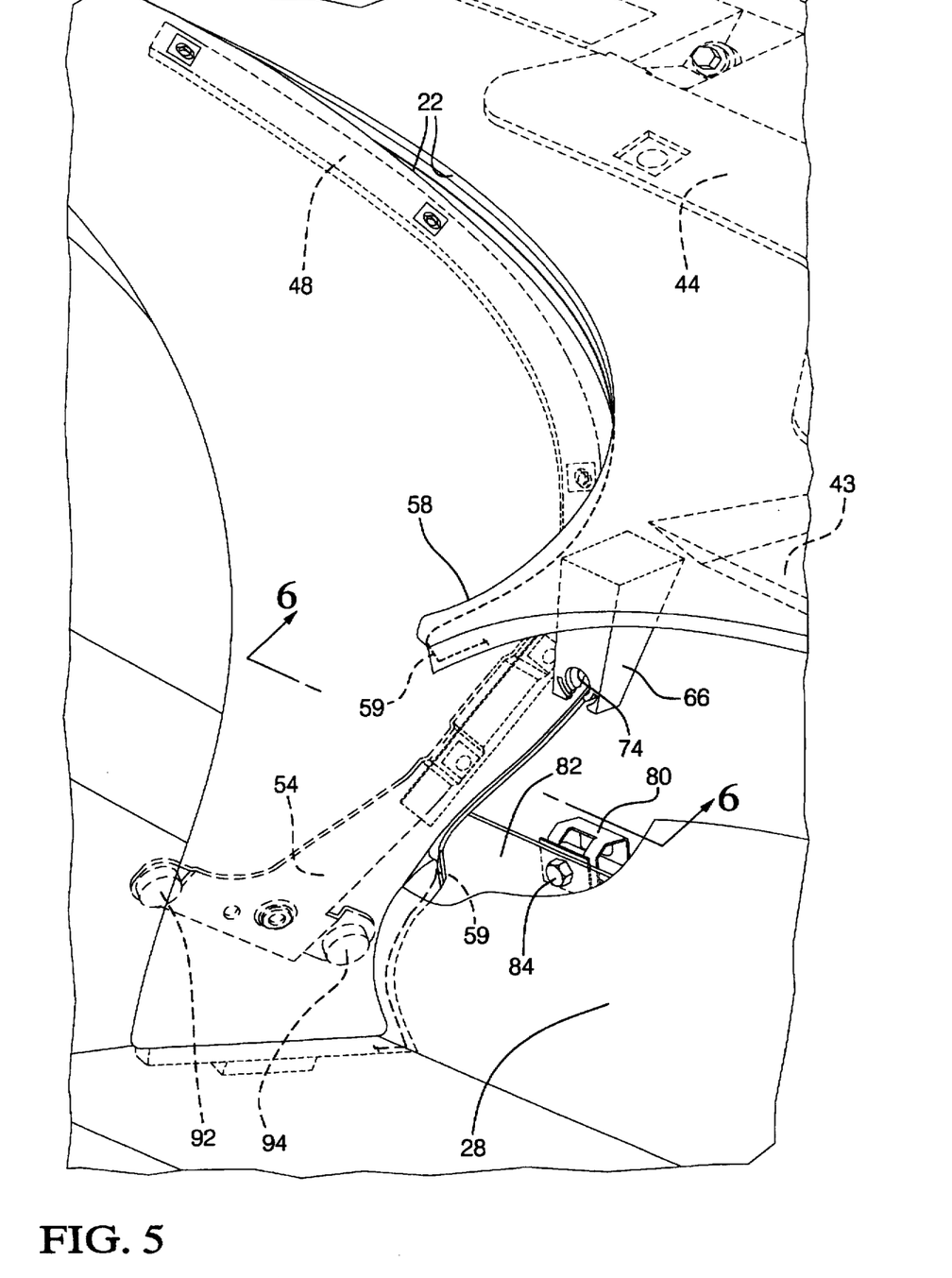
FIG. 5 is an enlarged view of a portion of FIG. 1 but showing the lifting and tearing of the instrument panel cover upon inflation of the air bag.
Figure 8:
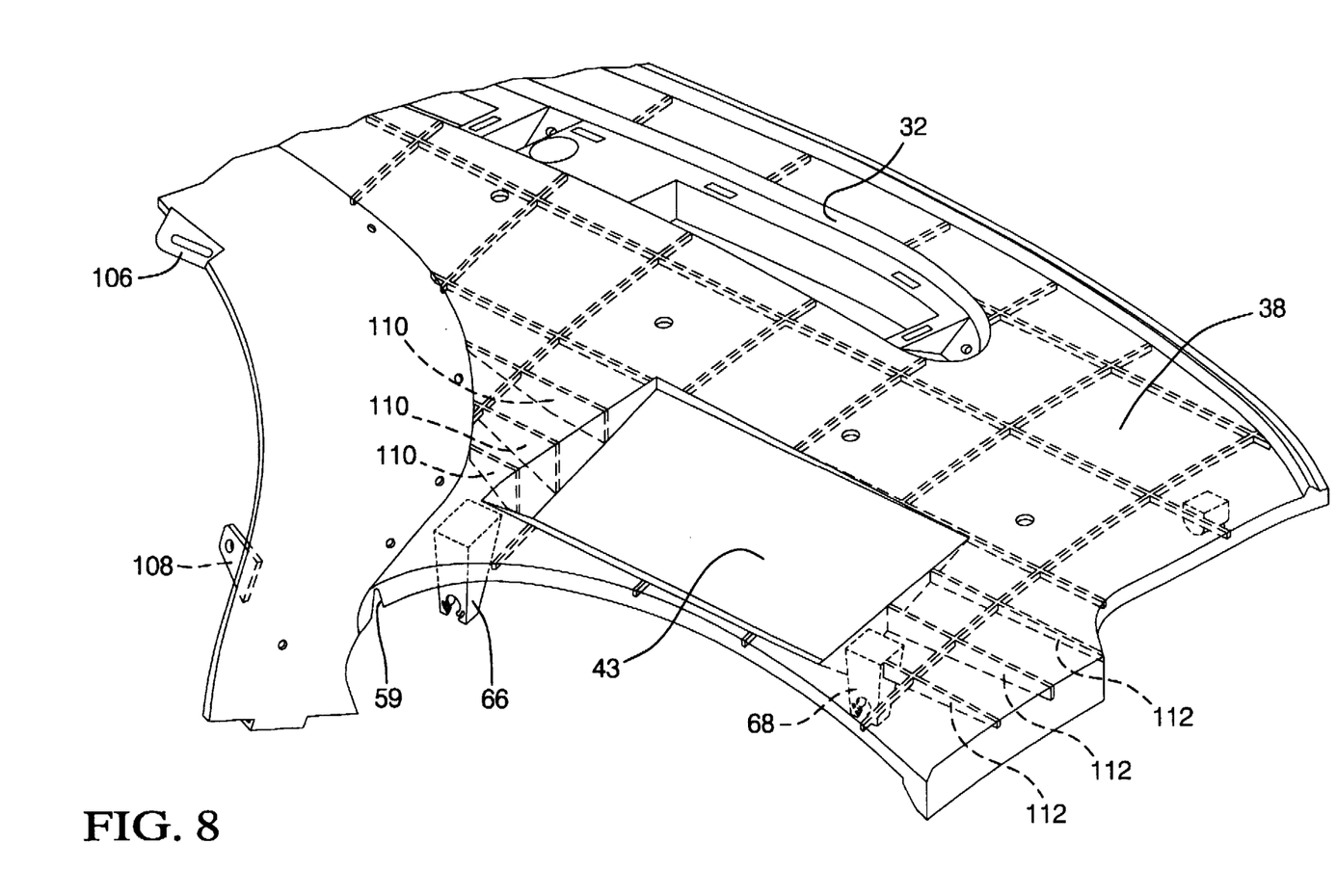
FIG. 8 is an enlarged view of a portion of the instrument panel showing reinforcing ribs molded on the underside of the cover.

Referring now to FIGS. 5 and 6, it will be appreciated and understood that the activation of the air bag will cause the air bag to inflate against the underside of the recessed wall 43 of the retainer panel 38 of the instrument panel cover assembly 10 and forcibly lift the passenger side portion 16 of the instrument panel cover assembly 10 upwardly away from the instrument panel structure 12. In particular, as seen in FIGS. 5 and 6, the initial upward lifting of the instrument panel cover assembly 10 will cause the leg 72 of the retainer 38 to detach from the fastener clip 80. The reinforcing bracket 48 which is attached to the instrument panel structure 12 by the anchor bracket 54 will function to hold the hood portion 18 firmly in place so that the instrument panel cover assembly 10 is caused to tear beginning at tear initiator notch 59 and proceeding along the weakened tear seam 58, as shown in FIG. 6. This tearing is facilitated by the undercut recess 62 of the retainer 38, the thinned cross section of the thickness of the molded foam 40, and the recess 60 of the vinyl cover 42. In addition, this tearing of the weakened tear seam 58 is facilitated by a plurality of reinforcing ribs 110, shown in FIG. 8, which extend from the recessed wall 43 of the molded retainer 38 to the under cut recess 62 to effectively transfer force from the inflating air bag to the weakened tear seam 58. The retainer 38 also has reinforcing ribs 112 which extend from the recessed wall 43 to the right hand end of the instrument panel cover assembly 10 to assist in lifting the cover assembly 10.

Figure 7:
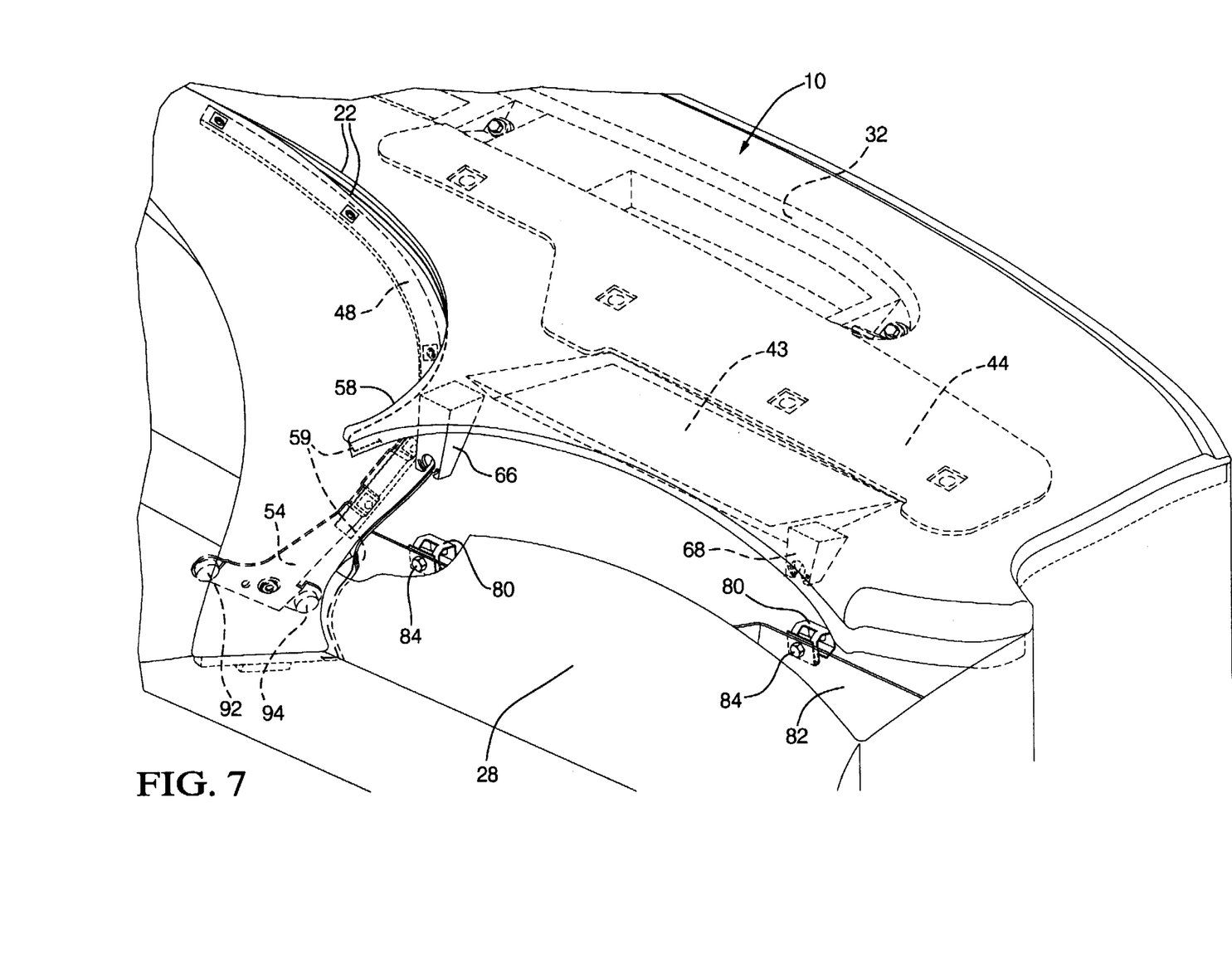
FIG. 7 is an enlarged view similar to FIG. 1 but showing the passenger side of the instrument panel cover having been lifted upon deployment of the air bag to restrain the vehicle passenger.

As seen in FIGS. 5 and 7, the instrument panel cover proceeds to tear along the styling line 22 defined by the recess 60 until the instrument panel cover assembly 10 reaches its full open position of FIG. 7.

Thus, it is seen that the invention provides a new and improved instrument panel cover assembly which eliminates the need for a separate air bag door to be provided within the instrument panel cover. Furthermore, it will appreciated that the tear seam of this invention can be readily hidden by registering the tear seam with the styling line of demarcation between the raised instrument hood portion of the instrument panel cover assembly and the more generally horizontal portion of the instrument panel cover assembly. However, if desired, the weakened tear seam may be provided at any other location generally between the passenger and the driver as desired to suit the styling and structure of the particular vehicle interior in which the invention is to be used.

We claim:

1. In combination with a motor vehicle having an instrument panel structure extending transversely across the vehicle body forwardly of both the driver and passenger sides of the occupant compartment:

an air bag module mounted on the instrument panel structure forwardly of the passenger and having an air bag normally stored and folded therein and inflatable to project into the occupant compartment to restrain the passenger;

an instrument panel cover mounted atop the instrument panel structure to conceal the air bag from view and extending transversely across the instrument panel structure forwardly of the driver and passenger sides of the occupant compartment and having a rearward edge extending transversely forwardly of both the driver and passenger, said instrument panel cover having a weakened tear seam originating at the rearward edge thereof at a point between the driver and the passenger and proceeding from the rearward edge in a generally forward direction;

and fasteners fastening the instrument panel cover to the instrument panel structure including fixed fasteners fastening the portion of the instrument panel cover generally forward of the driver in a fixed manner and detachable fasteners fastening at least the portion of the instrument panel cover generally forward of the passenger in a detachable manner;

whereby upon inflation of the air bag, the inflating air bag forcibly lifts the instrument panel cover upwardly as permitted by detachment of the detachable fasteners and tearing of the instrument panel cover along the weakened tear seam while the portion of the instrument panel cover forwardly of the driver remains fixedly attached to the instrument panel structure.

2. The combination of claim 1 further characterized by the instrument panel cover being a generally planar molded plastic construction having a generally raised hood portion integral therewith to wrap around an instrument display cluster and the weakened tear seam extends around the margin of the raised hood portion of the instrument panel cover.

3. The combination of claim 2 further characterized by said instrument panel cover having a reinforcing bracket attached thereto and extending along the weakened tear seam and associated with the fixed fasteners to hold down the instrument panel cover portion forwardly of the driver and thereby facilitate the upward lifting of the passenger side of the instrument panel cover along the weakened tear seam by the inflating air bag.

4. The combination of claim 2 further characterized by the instrument panel cover having a recessed wall portion overlying the air bag module and a plurality of reinforcing ribs extending from the recessed wall portion to proximity with the weakened tear seam.

* * * * *